US011351463B2

(12) United States Patent
Spitzer et al.

(10) Patent No.: US 11,351,463 B2
(45) Date of Patent: Jun. 7, 2022

(54) SYSTEM, METHOD, AND COMPUTER PROGRAM PRODUCT FOR SIMULTANEOUSLY DETERMINING SETTINGS FOR A PLURALITY OF PARAMETER VARIATIONS

(71) Applicant: NVIDIA Corporation, Santa Clara, CA (US)

(72) Inventors: John F. Spitzer, Monte Sereno, CA (US); Jing Wang, San Jose, CA (US); Christopher Justin Daniel, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 100 days.

(21) Appl. No.: 16/860,998

(22) Filed: Apr. 28, 2020

(65) Prior Publication Data
US 2020/0254348 A1    Aug. 13, 2020

Related U.S. Application Data

(63) Continuation of application No. 13/921,146, filed on Jun. 18, 2013, now Pat. No. 10,668,386, which is a
(Continued)

(51) Int. Cl.
*A63F 13/77* (2014.01)
*A63F 13/323* (2014.01)

(52) U.S. Cl.
CPC ............ *A63F 13/77* (2014.09); *A63F 13/323* (2014.09)

(58) Field of Classification Search
CPC .......... A63F 13/77; A63F 13/10; A63F 13/12; A63F 13/323; A63F 13/35; A63F 13/355;
(Continued)

(56) References Cited

U.S. PATENT DOCUMENTS

| 3,688,278 A | 8/1972 | Sauvan et al. |
| 5,086,386 A | 2/1992 | Islam |

(Continued)

FOREIGN PATENT DOCUMENTS

| CN | 1752952 A | 3/2006 |
| CN | 101303672 A | 11/2008 |

(Continued)

OTHER PUBLICATIONS

Notice of Allowance from U.S. Appl. No. 13/543,242, dated Sep. 16, 2015.
(Continued)

*Primary Examiner* — Catherine T. Rastovski
(74) *Attorney, Agent, or Firm* — Zilka-Kotab, P.C.

(57) ABSTRACT

A system, method, and computer program product are provided for simultaneously determining settings for a plurality of parameter variations. In use, a plurality of parameter variations associated with a device is identified, where the plurality of parameter variations are organized into a plurality of segments. Additionally, settings for each of the plurality of parameter variations are determined and consistency of the settings across the plurality of segments is ensured.

17 Claims, 7 Drawing Sheets

Related U.S. Application Data continuation-in-part of application No. 13/543,196, filed on Jul. 6, 2012, now Pat. No. 10,509,658.

(60) Provisional application No. 61/819,478, filed on May 3, 2013.

(58) Field of Classification Search
CPC ...... A63F 13/358; A63F 13/537; A63F 13/58; A63F 2300/534; A63F 2300/538; A63F 2300/66; A63F 2300/6615; G06F 16/285; G06F 9/4411; G09G 2340/04
See application file for complete search history.

(56) References Cited

U.S. PATENT DOCUMENTS

| | | | |
|---|---|---|---|
| 5,189,528 A | | 2/1993 | Takashima et al. |
| 5,671,351 A | | 9/1997 | Wild et al. |
| 5,675,773 A | | 10/1997 | Devic |
| 5,958,058 A | * | 9/1999 | Barrus ............... G06F 1/3203 713/320 |
| 5,987,624 A | | 11/1999 | Eglit |
| 6,044,476 A | | 3/2000 | Ote et al. |
| 6,059,842 A | | 5/2000 | Dumarot et al. |
| 6,306,063 B1 | * | 10/2001 | Horgan ............... F02D 41/021 477/108 |
| 6,314,479 B1 | | 11/2001 | Frederick et al. |
| 6,535,307 B1 | | 3/2003 | Allen et al. |
| 6,646,653 B2 | | 11/2003 | San et al. |
| 6,654,952 B1 | | 11/2003 | Nair et al. |
| 6,753,881 B1 | | 6/2004 | Callway et al. |
| 6,768,519 B2 | | 7/2004 | Fujita et al. |
| 6,847,358 B1 | | 1/2005 | Ford et al. |
| 6,850,973 B1 | | 2/2005 | Larson et al. |
| 6,901,580 B2 | | 5/2005 | Iwanojko et al. |
| 7,034,828 B1 | | 4/2006 | Drebin et al. |
| 7,080,247 B2 | | 7/2006 | Rochford, II et al. |
| 7,243,371 B1 | | 7/2007 | Kasper et al. |
| 7,293,201 B2 | | 11/2007 | Ansari |
| 7,299,382 B2 | | 11/2007 | Jorapur |
| 7,603,445 B1 | | 10/2009 | Fehrle |
| 7,626,944 B1 | | 12/2009 | Riddle |
| 7,659,897 B1 | | 2/2010 | Azar |
| 7,778,936 B2 | | 8/2010 | Adhikari |
| 8,064,358 B2 | | 11/2011 | Conoboy |
| 8,171,342 B2 | | 5/2012 | Wu |
| 8,276,133 B1 | | 9/2012 | Lebaredian et al. |
| 8,280,864 B1 | | 10/2012 | Herz et al. |
| 8,296,781 B1 | | 10/2012 | Lebaredian et al. |
| 8,756,394 B1 | | 6/2014 | Warner |
| 9,092,573 B2 | | 7/2015 | Spitzer et al. |
| 9,201,670 B2 | | 12/2015 | Spitzer |
| 9,250,931 B2 | | 2/2016 | Spitzer et al. |
| 9,275,377 B2 | | 3/2016 | Spitzer |
| 9,286,247 B2 | | 3/2016 | Spitzer et al. |
| 10,509,658 B2 | | 12/2019 | Spitzer et al. |
| 10,668,386 B2 | | 6/2020 | Spitzer et al. |
| 2001/0008021 A1 | | 7/2001 | Ote et al. |
| 2002/0031217 A1 | | 3/2002 | Kiykioglu |
| 2002/0073415 A1 | | 6/2002 | Kim et al. |
| 2002/0083228 A1 | | 6/2002 | Chiloyan et al. |
| 2002/0095501 A1 | | 7/2002 | Chiloyan et al. |
| 2003/0023841 A1 | * | 1/2003 | Atherton ............... H04L 41/083 713/1 |
| 2003/0033519 A1 | | 2/2003 | Buckman et al. |
| 2003/0055930 A1 | | 3/2003 | Haneda |
| 2003/0140333 A1 | | 7/2003 | Odaka et al. |
| 2003/0225917 A1 | | 12/2003 | Partamian et al. |
| 2004/0187103 A1 | | 9/2004 | Wickham et al. |
| 2004/0199615 A1 | | 10/2004 | Philyaw |
| 2004/0212610 A1 | | 10/2004 | Hamlin |
| 2004/0249618 A1 | | 12/2004 | Fine et al. |
| 2005/0076002 A1 | | 4/2005 | Williams et al. |
| 2005/0104888 A1 | | 5/2005 | Ford et al. |
| 2005/0120208 A1 | | 6/2005 | Dobson |
| 2005/0133067 A1 | | 6/2005 | Bergman |
| 2005/0225639 A1 | | 10/2005 | Somers |
| 2006/0112057 A1 | | 5/2006 | Lai |
| 2006/0132473 A1 | | 6/2006 | Fuller et al. |
| 2006/0188174 A1 | | 8/2006 | Minadakis |
| 2006/0200571 A1 | | 9/2006 | Backman |
| 2006/0217920 A1 | | 9/2006 | May et al. |
| 2007/0002347 A1 | | 1/2007 | Lai et al. |
| 2007/0055153 A1 | | 3/2007 | Simopoulos et al. |
| 2007/0066403 A1 | * | 3/2007 | Conkwright ......... A63F 13/803 463/43 |
| 2007/0098288 A1 | | 5/2007 | Raskar et al. |
| 2007/0153023 A1 | | 7/2007 | Chladny |
| 2007/0172140 A1 | | 7/2007 | Kokemohr |
| 2007/0268204 A1 | | 11/2007 | Kawabe |
| 2007/0277134 A1 | | 11/2007 | Zhang et al. |
| 2007/0300203 A1 | | 12/2007 | Jeong et al. |
| 2008/0005611 A1 | | 1/2008 | Solyanik |
| 2008/0040732 A1 | | 2/2008 | Akiyama et al. |
| 2008/0072077 A1 | | 3/2008 | Orr |
| 2008/0102957 A1 | | 5/2008 | Burman et al. |
| 2008/0133067 A1 | | 6/2008 | DeMay |
| 2008/0242423 A1 | | 10/2008 | Kerr et al. |
| 2008/0270569 A1 | | 10/2008 | McBride et al. |
| 2009/0011835 A1 | | 1/2009 | Hansen et al. |
| 2009/0057395 A1 | | 3/2009 | He et al. |
| 2009/0064053 A1 | | 3/2009 | Crawford et al. |
| 2009/0069084 A1 | | 3/2009 | Reece et al. |
| 2009/0094076 A1 | | 4/2009 | Reddy |
| 2009/0115778 A1 | | 5/2009 | Ford et al. |
| 2009/0210360 A1 | | 8/2009 | Sankar et al. |
| 2010/0162201 A1 | | 6/2010 | Shnaiderman et al. |
| 2010/0269137 A1 | | 10/2010 | Nakajima et al. |
| 2010/0318855 A1 | | 12/2010 | Beg et al. |
| 2010/0333081 A1 | | 12/2010 | Etchegoyen |
| 2011/0127954 A1 | | 6/2011 | Walley et al. |
| 2012/0089967 A1 | | 4/2012 | Varadarajan et al. |
| 2012/0101984 A1 | | 4/2012 | Lintum |
| 2012/0155475 A1 | | 6/2012 | Vasseur et al. |
| 2012/0166098 A1 | | 6/2012 | McCreary et al. |
| 2012/0272220 A1 | | 10/2012 | Calcagno et al. |
| 2013/0040629 A1 | | 2/2013 | Sprigg et al. |
| 2013/0173897 A1 | | 7/2013 | Wang |
| 2013/0338966 A1 | | 12/2013 | Spitzer |
| 2014/0009470 A1 | | 1/2014 | Spitzer et al. |
| 2014/0011581 A1 | | 1/2014 | Spitzer et al. |
| 2014/0012532 A1 | | 1/2014 | Spitzer et al. |
| 2014/0013094 A1 | | 1/2014 | Spitzer et al. |
| 2014/0013159 A1 | | 1/2014 | Spitzer et al. |
| 2014/0013303 A1 | | 1/2014 | Spitzer |
| 2020/0081724 A1 | | 3/2020 | Spitzer et al. |

FOREIGN PATENT DOCUMENTS

| | | |
|---|---|---|
| CN | 101738499 A | 6/2010 |
| TW | 413798 B | 12/2000 |
| TW | 201205427 A | 2/2012 |

OTHER PUBLICATIONS

Notice of Allowance from U.S. Appl. No. 13/525,119, dated Oct. 23, 2015.

Non-Final Office Action from U.S. Appl. No. 13/543,196, dated Mar. 22, 2016.

Non-Final Office Action from U.S. Appl. No. 13/921,146, dated Sep. 15, 2016.

Final Office Action from U.S. Appl. No. 13/543,196, dated Sep. 23, 2016.

Final Office Action from U.S. Appl. No. 13/921,146, dated Feb. 23, 2017.

Non-Final Office Action from U.S. Appl. No. 13/543,196, dated Feb. 17, 2017.

Non-Final Office Action from U.S. Appl. No. 13/543,196, dated Jan. 12, 2018.

Non-Final Office Action from U.S. Appl. No. 13/543,196, dated Aug. 10, 2018.

(56) References Cited

OTHER PUBLICATIONS

Schichl et al., "Interval Analysis on Directed Acyclic Graphs for Global Optimization," Journal of Global Optimization, vol. 33, 2005, pp. 541-562.
Examiner's Answer to Appeal Brief from U.S. Appl. No. 13/921,146, dated Nov. 26, 2018.
Non-Final Office Action from U.S. Appl. No. 13/543,196, dated Mar. 6, 2019.
Notice of Allowance from U.S. Appl. No. 13/543,196, dated Aug. 12, 2019.
Spitzer et al., U.S. Appl. No. 16/681,567, filed Nov. 12, 2019.
Notice of Allowance from U.S. Appl. No. 13/921,146, dated Jan. 29, 2020.
Patent Board Decision on Appeal from U.S. Appl. No. 13/921,146, dated Dec. 26, 2019.
Non-Final Office Action from U.S. Appl. No. 13/921,146, dated Sep. 15, 2017.
Final Office Action from U.S. Appl. No. 13/921,146, dated Mar. 9, 2018.
Non-Final Office Action from U.S. Appl. No. 16/681,567, dated Mar. 3, 2020.
Notice of Allowance from U.S. Appl. No. 16/681,567, dated Jun. 4, 2020.
Non-Final Office Action from U.S. Appl. No. 13/543,242, dated Oct. 6, 2014.
Final Office Action from U.S. Appl. No. 12/352,268, dated Jan. 28, 2015.
Non-Final Office Action from U.S. Appl. No. 13/543,212, dated Nov. 5, 2014.
Final Office Action from U.S. Appl. No. 13/543,184, dated Dec. 3, 2014.
Non-Final Office Action from U.S. Appl. No. 13/525,119, dated Feb. 5, 2015.
Hellerstein, J., "Optimizing Software Packages for Application Management," IEEE, 2008, pp. 1-8.
Advisory Action from U.S. Appl. No. 13/543,184, dated Feb. 12, 2015.
Advisory Action from U.S. Appl. No. 12/001,669, dated Oct. 14, 2011.
Final Office Action from U.S. Appl. No. 12/001,669, dated Jul. 21, 2011.
Notice of Allowance from U.S. Appl. No. 12/001,669, dated Aug. 31, 2012.
Non-Final Office Action from U.S. Appl. No. 12/001,669, dated Feb. 17, 2011.
Non-Final Office Action from U.S. Appl. No. 12/001,669, dated May 11, 2012.
Final Office Action from U.S. Appl. No. 12/001,504, dated Feb. 7, 2012.
Notice of Allowance from U.S. Appl. No. 12/001,504, dated Jun. 7, 2012.
Non-Final Office Action from U.S. Appl. No. 12/001,504, dated Aug. 5, 2011.
Advisory Action from U.S. Appl. No. 11/958,266, dated Feb. 22, 2012.
Final Office Action from U.S. Appl. No. 11/958,266, dated Oct. 19, 2010.
Final Office Action from U.S. Appl. No. 11/958,266, dated Dec. 12, 2011.
Notice of Allowance from U.S. Appl. No. 11/958,266, dated Jul. 2, 2012.
Non-Final Office Action from U.S. Appl. No. 11/958,266, dated Feb. 23, 2010.
Non-Final Office Action from U.S. Appl. No. 11/958,266, dated Jun. 21, 2011.
Non-Final Office Action from U.S. Appl. No. 12/352,268, dated Feb. 10, 2012.
Ribeiro-Filho et al., "GAME—A Framework for Programming Genetic Algorithm Applications," IEEE, 1994, pp. 340-845.
Unigraphics Basics, Nov. 14, 2004, retrieved from https://web.archive.org/web/20041 114135544/http://homepages.cae.wisc.edu/~me232/ug/ug_basic.html.
Schmid, P., "Game Over? Core 2 Duo Knocks Out Athlon 64," Jul. 14, 2006, retrieved from http://www.tomshardware.com/reviews/core2-duo-knocks-athlon-64,1282-11.html.
Final Office Action from U.S. Appl. No. 12/352,268, dated Jan. 16, 2014.
Final Office Action from U.S. Appl. No. 12/352,268, dated Dec. 21, 2012.
Non-Final Office Action from U.S. Appl. No. 12/352,268, dated Jun. 19, 2014.
Non-Final Office Action from U.S. Appl. No. 12/352,268, dated Jun. 24, 2013.
Non-Final Office Action from U.S. Appl. No. 13/543,228, dated Jun. 13, 2014.
Myanchama, M. et al., "The Role Graph Model and Conflict of Interest", Feb. 1999, pp. 3-33.
Notice of Allowance from U.S. Appl. No. 13/543,228, dated Nov. 21, 2014.
Non-Final Office Action from U.S. Appl. No. 13/543,184, dated Jul. 22, 2014.
Notice of Allowance from U.S. Appl. No. 13/543,228, dated Mar. 17, 2015.
Final Office Action from U.S. Appl. No. 13/543,212, dated Mar. 18, 2015.
Non-Final Office Action from U.S. Appl. No. 13/543,196, dated Mar. 18, 2015.
Final Office Action from U.S. Appl. No. 13/543,242, dated May 15, 2015.
Notice of Allowance from U.S. Appl. No. 13/543,212, dated Jun. 8, 2015.
Non-Final Office Action from U.S. Appl. No. 13/525,119, dated Jul. 2, 2015.
Notice of Allowance from U.S. Appl. No. 13/543,184, dated Jul. 27, 2015.
Final Office Action from U.S. Appl. No. 13/543,196, dated Jul. 17, 2015.
Advisory Action from U.S. Appl. No. 13/543,196, dated Sep. 16, 2015.
Notice of Allowance from U.S. Appl. No. 13/543,212, dated Sep. 29, 2015.

\* cited by examiner

SYSTEM, METHOD, AND COMPUTER PROGRAM PRODUCT FOR SIMULTANEOUSLY DETERMINING SETTINGS FOR A PLURALITY OF PARAMETER VARIATIONS

CLAIM OF PRIORITY

This application is a continuation of U.S. application Ser. No. 13/921,146, filed Jun. 18, 2013, which is a continuation-in-part of U.S. application Ser. No. 13/543,196, filed Jul. 6, 2012, and which also claims the benefit of U.S. Provisional Application No. 61/819,478, filed May 3, 2013. The entire contents of these applications are incorporated herein by reference.

FIELD OF THE INVENTION

The present invention relates to parameter analysis, and more particularly to determining settings based on parameter analysis.

BACKGROUND

Many products in existence today include one or more parameters that influence an overall experience associated with the product. For example, computer games and other software may have many parameters that determine a quality of rendering, audio, game play, etc. However, current techniques for arranging the parameters associated with these products have been associated with various limitations.

For example, currently, customers may be responsible for manually adjusting a plurality of parameters associated with a product in order to determine appropriate settings for that product. This may result in less than optimal settings for the product, time-consuming trial and error by the customer, etc. There is thus a need for addressing these and/or other issues associated with the prior art.

SUMMARY

A system, method, and computer program product are provided for simultaneously determining settings for a plurality of parameter variations. In use, a plurality of parameter variations associated with a device is identified, where the plurality of parameter variations are organized into a plurality of segments. Additionally, settings for each of the plurality of parameter variations are determined and consistency of the settings across the plurality of segments is ensured.

DETAILED DESCRIPTION

Figure 1:
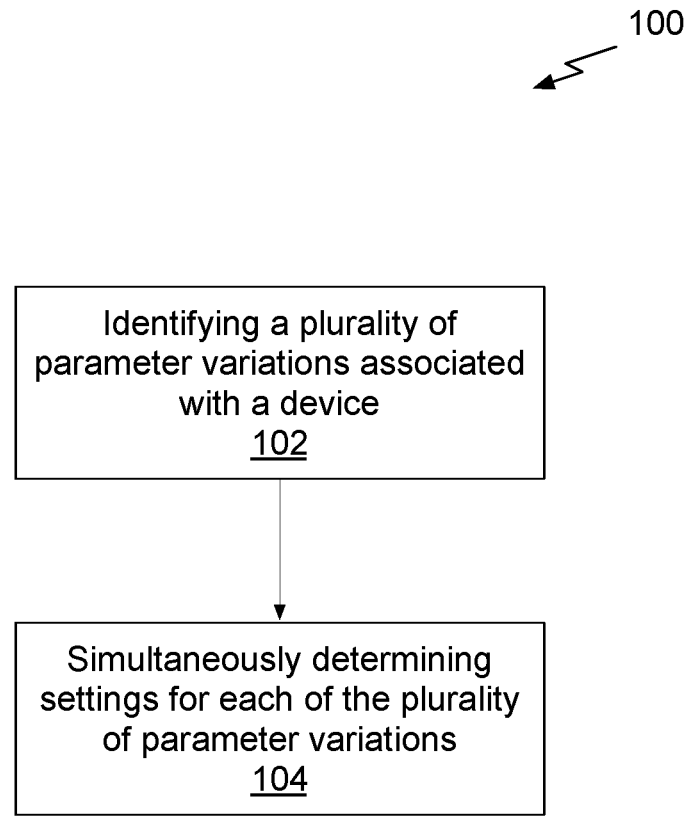
FIG. 1 shows a method for simultaneously determining settings for a plurality of parameter variations, in accordance with one embodiment.

FIG. 1 shows a method 100 for simultaneously determining settings for a plurality of parameter variations, in accordance with one embodiment. As shown in operation 102, a plurality of parameter variations associated with a device is identified. In one embodiment, the device may include an object such as a personal computer or other hardware element. In another embodiment, the plurality of parameter variations may include a plurality of unique variations of a plurality of different parameters.

Additionally, in one embodiment, the parameters may include any characteristics of the device. For example, the parameters may include hardware (e.g., a central processing unit (CPU), a graphics processing unit (GPU), random access memory (RAM), a motherboard, a display, etc.) installed within the device (e.g., a desktop computer, laptop computer, tablet computer, personal digital assistant, cellular telephone, etc.), software (e.g., an operating system, drivers, etc.) installed within the device, etc.

Further, in one embodiment, one or more of the parameters may be independently configurable. For example, each of the parameters may be able to be altered independently from the other parameters. In another embodiment, each of the parameters may be utilized by the device to perform one or more actions. In yet another embodiment, the parameter variations may include a plurality of different types of the parameter, which may include a size, magnitude, speed, etc. associated with the parameter. For example, if the parameter is a device CPU, then the variations of the parameter may include a manufacturer of the CPU, a speed of the CPU, a cache size of the CPU, etc. In another example, if the parameter is RAM, then the variations may include an amount of RAM, a speed of the RAM, a manufacturer of the RAM, etc.

Further still, in one embodiment, the plurality of parameter variations may be identified at a server. For example, each of the plurality of parameter variations may be sent from a user device having those parameter variations to a server via a network (e.g., a wireless network, a wired network, a cellular network, a satellite network, etc.). In another embodiment, the plurality of parameter variations may be stored in and retrieved from a database.

Also, in one embodiment, the plurality of parameter variations associated with the device may be identified based on one or more criteria. For example, a predetermined number of parameter variations that are determined to be the most popular user parameter variations (e.g., parameter variations most often used in customer devices, etc.) may be selected as the plurality of parameter variations associated with the device.

Additionally, as shown in operation 104, settings for each of the plurality of parameter variations are determined simultaneously. In one embodiment, the settings determined for each of the plurality of parameter variations may include optimized settings that manipulate one or more aspects of the plurality of parameter variations. In another embodiment, the settings for each of the plurality of parameter variations may include a monotonic set of predefined settings (presets). For example, settings for each of the plurality of parameter variations may include a monotonic set of presets that sequentially increases with respect to a first characteristic and sequentially decreases with respect to a second characteristic.

In another example, the monotonic set of presets may be ordered, and each successive preset within the set of presets may have an improved first characteristic and a decreased second characteristic when compared to the previous preset within the set of presets. In yet another embodiment, the first characteristic may be associated with quality (e.g., image quality, sound quality, experience quality, etc.), and the second characteristic may be associated with performance (e.g., speed, economy, efficiency, etc.) or power level or some ratio of performance per unit of power. For example, a software element may be run on the device, and each successive preset within the set of presets may have an improved image quality of the software element and a decreased performance of the software element.

In another embodiment, the settings may be determined utilizing an algorithm. For example, the settings may be determined utilizing a greedy algorithm, an exhaustive algorithm, etc. In another embodiment, the settings may be determined by maximizing a first characteristic with respect to a second characteristic for each preset of the set of presets. For example, each of a plurality of settings for a parameter variation may have a first characteristic associated with quality and a second characteristic associated with performance, and the first characteristic may be optimized with respect to the second characteristic.

Further, in one embodiment, for each of the plurality of parameter variations, the settings may include a configuration of that parameter variation such that the device having that parameter variation produces a maximized output (e.g., image quality, etc.) while maintaining a threshold requirement (e.g., a minimum frame rate, maximum power usage, etc.), while running a predetermined software element. In another embodiment, the software element may include a software program that may be installed or is to be installed within the device.

Further still, in one embodiment, simultaneously determining settings for each of the plurality of parameter variations may include creating a directed acyclic graph (DAG) including a plurality of nodes, where each of the plurality of nodes represents one of the plurality of parameter variations. In another embodiment, the nodes of the DAG may be directed based on one or more criteria. For instance, each of the plurality of nodes of the DAG may be directed within the DAG based on the speed associated with each node, where the speed is determined based on the device parameter variations represented by the node. In another embodiment, the nodes may be directed in the DAG such that a first node of the DAG may point to a second node of the DAG when it is determined that the second node of the DAG is definitively faster in one or more respects (e.g., with respect to processing speed, etc.) than the first node of the DAG.

Also, in one embodiment, simultaneously determining settings for each of the plurality of parameter variations may include adjusting one or more settings associated with each of the plurality of parameter variations. For example, for each of the plurality of parameter variations, one or more associated settings may be adjusted (e.g., turned on or off, increased, reduced, etc.) to determine the greatest possible magnitude of a first characteristic with respect to a second characteristic. In another embodiment, the settings determined for each of the plurality of parameter variations may include the settings for the plurality of parameter variations that yield the greatest possible magnitude of the first characteristic with respect to the second characteristic.

In addition, in one embodiment, simultaneously determining settings for each of the plurality of parameter variations may include successively adjusting a single setting for each of the plurality of parameter variations simultaneously. For example, for each of the plurality of parameter variations, a first determined setting may be adjusted to determine the greatest possible magnitude of a first characteristic with respect to a second characteristic. Additionally, after the first determined setting is adjusted, a second setting may be determined to be adjusted, where the second determined setting is adjusted for each of the plurality of parameter variations.

In another embodiment, simultaneously determining settings for each of the plurality of parameter variations may include starting at a minimum settings amount for each of the plurality of parameter variations and successively increasing a single setting for each of the plurality of parameter variations simultaneously. In yet another embodiment, simultaneously determining settings for each of the plurality of parameter variations may include starting at a maximum settings amount for each of the plurality of parameter variations and successively decreasing a single setting for each of the plurality of parameter variations simultaneously.

In still another embodiment, simultaneously determining settings for each of the plurality of parameter variations may include starting at both a maximum settings amount and a minimum settings amount for each of the plurality of parameter variations and successively decreasing a single setting from the maximum and increasing a single setting from the minimum for each of the plurality of parameter variations simultaneously, until optimal settings are determined that yield the greatest possible magnitude of the first characteristic with respect to the second characteristic.

Furthermore, in one embodiment, each of the plurality of parameter variations may influence how the settings are determined. For example, each of the plurality of parameter variations (or their respective node in the DAG) may vote for a first determined setting that is adjusted for each of the plurality of parameter variations. In another example, after the first determined setting is adjusted for each of the plurality of parameter variations, each of the plurality of parameter variations (or their respective node in the DAG) may then vote for a second determined setting that is adjusted for each of the plurality of parameter variations.

Further still, in one embodiment, each of the plurality of parameter variations may have a different level of influence as to how the settings are determined. For example, a population value may be associated with each of the plurality of parameter variations (or their respective node in the DAG). In another embodiment, a population value associated with a particular parameter variation may correspond to a predetermined number of users that have that parameter variation (e.g., installed within their device, etc.). In yet another embodiment, a population value associated with a particular parameter variation may correspond to a predetermined percentage of a total number of users that have that parameter variation.

In still another embodiment, the population value associated with a particular parameter variation may influence a magnitude (e.g., strength, etc.) of the influence exerted by the particular parameter variation with respect to how the settings are determined. For example, a vote by the particular parameter variation for a determined setting that is adjusted for each of the plurality of parameter variations may be increased proportionately by the population value associated with the particular parameter variation (e.g., by multiplying the vote by the population value, etc.). In this way, popular parameter variations used by a large user base may have more influence as to how the settings are determined.

Also, in one embodiment, an index value (e.g., an influence value, etc.) may be associated with each of the plurality of parameter variations (or their respective node in the DAG). In another embodiment, the index value associated with a particular parameter variation may correspond to an ability of the particular parameter variation to run a predetermined software element at a predetermined frame rate. For example, the index value may be −1 if the particular parameter variation cannot run the predetermined software element at the predetermined frame rate. In another example, the index value may be zero if the particular parameter variation can run the predetermined software element utilizing one or more minimum settings at the predetermined frame rate. In yet another embodiment, the index value may be (n−1) if the particular parameter variation can run the predetermined software element utilizing a maximum setting for an application at the predetermined frame rate, where n equals the number of preset settings for each of the plurality of parameter variations supported by the application. Each preset setting corresponds to an index.

In still another embodiment, the index value associated with a particular parameter variation may influence a magnitude (e.g., strength, etc.) of the influence exerted by the particular parameter variation with respect to how the settings are determined. For example, a vote by the particular parameter variation for a determined setting that is adjusted for each of the plurality of parameter variations may be increased or decreased proportionately by the index value associated with the particular parameter variation (e.g., by multiplying the vote by the index value, etc.). In this way, parameter variations that are more likely to use the settings may have more influence as to how the settings are determined.

Additionally, in one embodiment, a disagreement may be identified between the plurality of parameter variations (or their respective nodes in the DAG) during voting for determined settings to be adjusted for each of the plurality of parameter variations. For example, a portion of the plurality of parameter variations (or their respective nodes in the DAG) may vote for one particular setting that is to be adjusted for each of the plurality of parameter variations, and another portion of the plurality of parameter variations (or their respective nodes in the DAG) may vote for another particular setting that is to be adjusted for each of the plurality of parameter variations.

Further, in response to the identification of the disagreement between the plurality of parameter variations, the plurality of parameter variations may be divided into a plurality of sub groups (e.g., smaller DAGs, etc.). For example, if a predetermined percentage of the plurality of parameter variations (or their respective nodes in the DAG) vote for a particular setting different from settings voted for by other parameter variations (or their respective DAG nodes), the predetermined percentage of the plurality of parameter variations may be removed from the DAG and may be placed in a sub DAG for settings determination. In this way, settings determination may be more efficiently determined for the parameter variations in each sub group.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
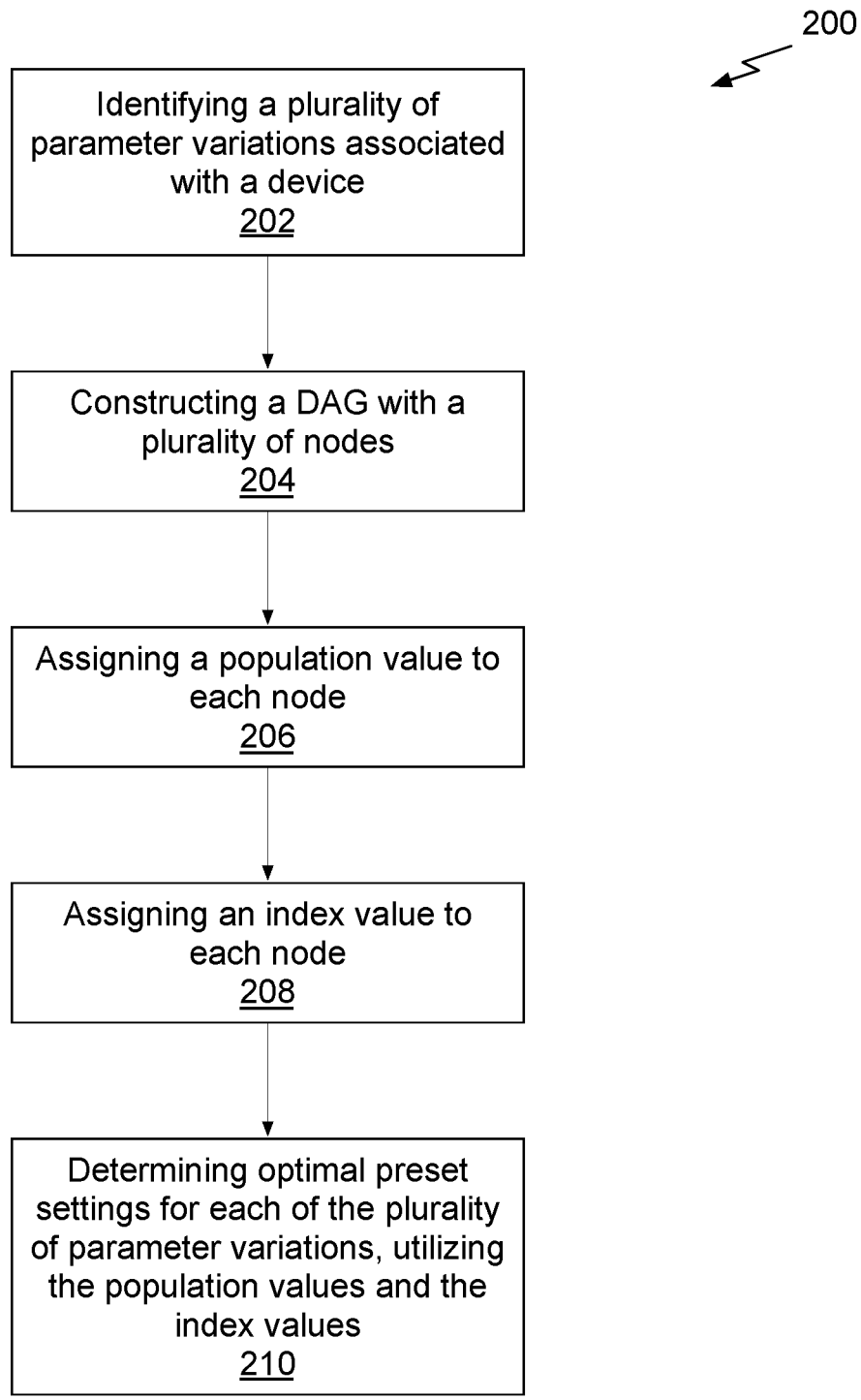
FIG. 2 shows a method for simultaneously determining a plurality of optimal settings, in accordance with another embodiment.

FIG. 2 shows a method 200 for simultaneously determining a plurality of optimal settings, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a plurality of parameter variations associated with a device is identified. In one embodiment, the plurality of parameter variations may include parameter variations associated with a display of the personal computer. For example, the plurality of parameter variations may include a screen resolution of the personal computer. In another embodiment, the plurality of parameter variations may include parameter variations associated with the rendering of graphics by the personal computer. For example, the plurality of parameter variations may include specifics of system hardware installed within the device (e.g., CPU specifics, GPU specifics, motherboard specifics, RAM specifics, etc.), specifics of system software installed within the device, etc.

Additionally, as shown in operation 204, a DAG with a plurality of nodes is constructed, where each of the plurality of nodes corresponds to one of the plurality of parameter variations. In one embodiment, the nodes in the DAG may be directed based on one or more rules. For example, the nodes may be directed within the DAG based on the speed associated with each node, where the speed is determined based on the parameter variations represented by the node. In another embodiment, the nodes may be directed in the DAG such that a first node of the DAG may point to a second node of the DAG when it is determined that the second node of the DAG is definitively faster in one or more respects (e.g., with respect to processing speed, etc.) than the first node of the DAG.

Also, in one embodiment, each node in the DAG may represent a unique variation of a plurality of possible parameters associated with the device. For example, the plurality of possible parameters associated with the device may include a device CPU, a device GPU, and a device resolution, and each node in the DAG may represent a unique combination of a particular device CPU, device GPU, and device resolution. In this way, a first node pointing to a second node within the DAG signifies that the plurality of parameter variations associated with the device that are represented by the second node in the DAG offer definitively better processing speed and performance than the plurality of parameter variations associated with the device that are represented by the first node in the DAG.

Further, as shown in operation 206, a population value associated with each node is assigned to each node. In one embodiment, a plurality of population values may be obtained as a result of analytical operations. In another embodiment, the plurality of population values may include telemetry data. In yet another embodiment, the plurality of population values may be retrieved from a population value database. In still another embodiment, the population value assigned to a node may represent a user population that owns a device having the parameter variations corresponding to that node.

In one embodiment, a population is assigned to a new node using a "proxy" mechanism. The new node may correspond to a new configuration including a new GPU, and/or a new CPU, and/or a new display resolution. Because new nodes naturally have a user base of zero initially, the new node may "borrow" the population values from another configuration in the same class as the new node, preferably from the prior generation. For example, a new configuration may borrow the population values of an existing configuration that has been in use for a long enough time to have an established and definable user base. The existing configuration serves as a "proxy" for the new node. For example, the existing configuration may be duplicated, as well as the associated population values, with the GPU being replaced with a new GPU. The "proxy" mechanism enables pre-population of a DAG with historical data to initialize the new nodes even before the new configuration is released into the market.

Further still, as shown in operation 208, an index value is associated with each node. In one embodiment, an index value may be determined for a node by calculating an ability of the particular parameter variation represented by that node to run a predetermined software element at a predetermined frame rate. In another embodiment, an index value may be determined for a node based on the location of the node within the DAG. For example, in one embodiment, stronger nodes in the DAG are assigned higher index values.

Also, as shown in operation 210, optimal preset settings are determined for each of the plurality of parameter variations, utilizing the population values and the index values. In one embodiment, the optimal preset settings may include a monotonic set of presets for the device. In another embodiment, the monotonic set of presets may be determined with respect to one or more software elements installed on the device. For example, the monotonic set of presets may be determined for an instance of an application (e.g., video game software, media playback software, etc.) installed on the device. In yet another embodiment, the monotonic set of presets may be determined with respect to one or more software elements to be installed on the device (e.g., not yet installed on the device, etc.).

In yet another embodiment, the monotonic set of presets may represent device settings (both dependent and independent) that impact the way the device runs the one or more software elements. For example, each of the monotonic set of presets may dictate a texture mapping level of displayed graphics provided by the device a lighting model used by the device during the display of graphics, an antialiasing level, an object detail level, etc.

In addition, in one embodiment, determining the optimal preset settings may include determining a plurality of performance levels for the device. For example, a plurality of descending performance levels (e.g., from a maximum performance level to a minimum performance level, etc.) may be determined for the device (e.g., utilizing one or more benchmarks, etc.), where each successive performance level indicates that the device performs (e.g., runs, computes, etc.) at a slower rate, less efficiently, or in an otherwise less desirable manner when compared to the previous level. In another embodiment, the performance level may be associated with a level of resources used by the device. For example, the performance level may indicate an amount of processing resources used by the device, an amount of software resources used by the device, an amount of network resources utilized by the device, a frame rate provided by the device, a power resource used by the device, etc. For example, when a device is operating using battery power (as opposed to being plugged into a power supply outlet), the image quality may be reduced to reduce power consumption and increase battery life.

Further, in one embodiment, determining the optimal preset settings may include determining a plurality of image quality levels for the device. For example, a plurality of ascending image quality levels (e.g., from a minimum image quality level to a maximum image quality level, etc.) may be determined for the device, where each successive image quality level indicates that the image quality displayed by the device (e.g., one or more of the resolution, color, detail, etc.) increases when compared to the previous level.

Further still, in one embodiment, each of the plurality of performance levels may be associated with one of the plurality of image quality levels for the device. For example, each successively descending performance level may be associated with a successively increasing image quality level, such that as the performance of the device decreases or a level of power available to the device, the image quality produced by the device increases. In another embodiment, the image quality level may be maximized for each of the plurality of performance levels, based on the plurality of parameter variations of the device.

For example, for each determined performance level or level of power, a maximum image quality may be determined that can be provided by the device based on the plurality of parameter variations of the device. In one embodiment, the maximum image quality may be calculated utilizing a greedy algorithm. In another embodiment, the maximum image quality may be calculated utilizing an exhaustive algorithm. Of course, however, the maximum image quality for each performance level may be calculated in any manner. In this way, the presets may be monotonically increasing in terms of image quality and monotonically decreasing in terms of performance.

Also, in one embodiment, the maximum image quality may be determined utilizing an analog approach. For example, a plurality of adjustment elements, a "bang-for-buck" indicator, and "fail" indicator may be provided. In another example, each adjustment element may represent one property in the application. In yet another example, each adjustment element may be adjusted in discrete steps. In another embodiment, the "bang-for-buck" indicator may return an overall value (e.g., an image quality times a frame rate) for a present preset. In yet another embodiment, the "fail" indicator may be activated if and only if the preset is invalid. This may be needed if there are dependent variables, and some combinations of adjustment elements are indeed invalid.

For example, two adjustment elements A and B may have stops False and True, but adjustment element B may only be set to True if and only if adjustment element A is also set to True. In such case, the "fail" indicator may be activated only when adjustment element A is set to False, and adjustment element B is set to True. In another embodiment, it may be assumed that stops are ordered such that adjusting an adjustment element up one stop always results in equal/better image quality, and equal/worse performance.

Additionally, in one embodiment, in a simultaneous manner for each of the parameter variations, a monotonic set determination algorithm may start with all adjustment elements turned all the way down to their minimum levels (i.e., their "minset" values). Now, one adjustment element at a time, each adjustment element may be temporarily incrementally turned up exactly one stop to its maximum value (e.g., if the adjustment element is turned all the way to 10 out of 10, it will not turn to 11). If the "fail" indicator doesn't activate, the "bang-for-buck" indicator value may be recorded, before setting that adjustment element back to its original position. Once all adjustment elements have been incrementally turned up, the element which produced the highest "bang-for-buck" indicator value (and was still valid) is permanently adjusted one stop. This process may be repeated in this way until all adjustment elements are at their maximum setting (i.e. their "maxset" values). The sequence of (# Stops–# adjustment elements+1) presets which were chosen may represent optimal monotonic presets.

Further, in another embodiment, in a simultaneous manner for each of the parameter variations, a monotonic set determination algorithm may start with all adjustment elements turned all the way up to their maximum levels (i.e., their "maxset" values). Now, one adjustment element at a time, each adjustment element may be temporarily incrementally turned down exactly one stop. If the "fail" indicator doesn't activate, the "bang-for-buck" indicator value may be recorded, before setting that adjustment element back to its original position. Once all adjustment elements have been incrementally turned down, the element which produced the highest "bang-for-buck" indicator value (and was still valid) is permanently adjusted one stop. This process may be repeated in this way until all adjustment elements are at their maximum setting (i.e. their "maxset" values).

Further still, in one embodiment, in a simultaneous manner for each of the parameter variations, one or more of the monotonic set determination algorithms may start with all adjustment elements turned all the way down to their minimum levels, and one or more of the monotonic set determination algorithms may start with all adjustment elements turned all the way up to their maximum levels. Additionally, adjustments may be incrementally made by each of the algorithms until the adjustments converge. In this way, optimal preset settings may be determined in an expedited manner. Additionally, faster configurations may influence preset settings that are of importance to them and may avoid preset settings associated with and determined by slower configurations.

Also, in one embodiment, each of the plurality of nodes in the DAG may vote on which adjustment element to manipulate (e.g., increase or decrease, etc.). For example, each of the plurality of nodes in the DAG may cast one vote as to which adjustment element may be temporarily incrementally turned up or down exactly one stop for each of the parameter variations corresponding to the nodes in the DAG. In another embodiment, the adjustment element obtaining the largest number of votes may be selected to be incrementally turned up or down for each node.

In another embodiment, each node's vote may be adjusted according to the population value and index value associated with that node. For example, each node's vote may be increased in proportion to its population value and may be increased or decreased according to its index value. In this way, more popular and more relevant nodes in the DAG may be given a greater weight during voting.

In addition, optimal preset settings may be determined for each of the plurality of parameter variations simultaneously, where such presets may range from a lowest setting (e.g., "minset," etc.) to the highest setting (e.g., "maxset," etc.) and which may maximize "bang-for-buck" (e.g., image quality per performance unit, etc.) at every step along the way. Further, the order of the monotonic plurality of presets may be maintained such that monotonicity of performance and image quality may be guaranteed if parameter enumerants are each ordered in same. Further, optimal preset settings for the plurality of parameter variations may be determined, such that image quality may be maximized with respect to performance cost for each of the optimal preset settings.

Figure 3A:
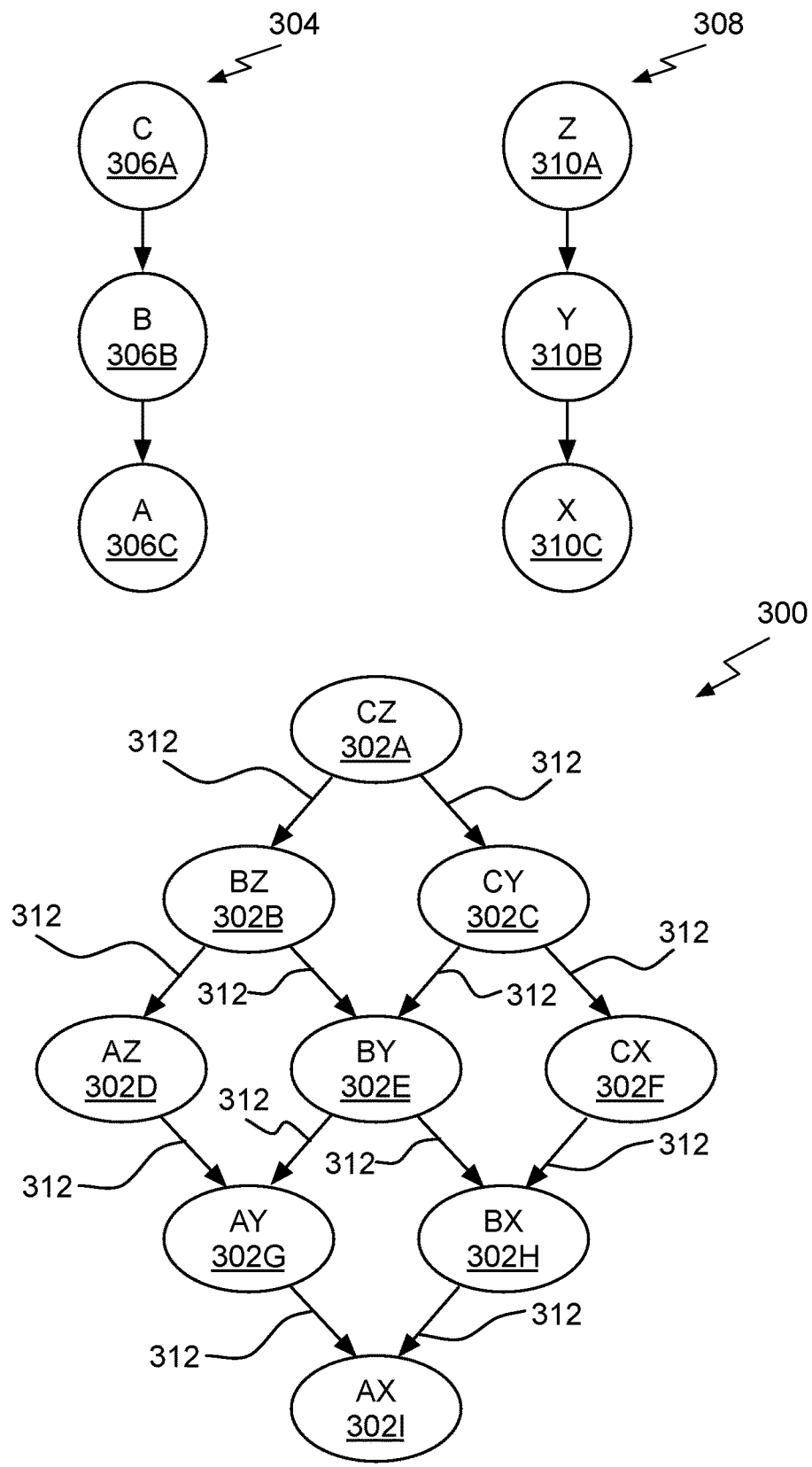
FIG. 3A shows an exemplary parameter DAG, in accordance with another embodiment.

FIG. 3A shows an exemplary parameter DAG 300, in accordance with another embodiment. As an option, the exemplary parameter DAG 300 may be carried out in the context of the functionality of FIGS. 1-2. Of course, however, the exemplary parameter DAG 300 may be implemented in any desired environment. It should also be noted that the aforementioned definitions may apply during the present description.

As shown, the exemplary parameter DAG 300 includes a plurality of nodes 302A-I that each correspond to a unique combination of a first set 304 of variations 306A-C of a first component (e.g., a CPU type, etc.) of a personal computer and a second set 308 of variations 310A-C of a second component (e.g., a GPU type) of the personal computer. In one embodiment, the DAG 300 may include a directed graph with no directed cycles formed by the collection of nodes 302A-I (e.g., vertices, etc.) and a plurality of directed edges 312, such that there is no way to start at any node in the DAG 300 and follow a sequence of edges that eventually loops back that starting node again.

Additionally, the nodes in both the first set 304 of variations 306A-C of the first component and the second set 308 of variations 310A-C of the second component are directed based on processing speed, with slower nodes pointing to faster nodes. As such, the first node 306A is the slowest node in the first set 304, the second node 306B is faster than the first node 306A but slower than the third node 306C in the first set 304, and the third node 306C is the fastest node in the first set 304.

In one embodiment, the speed of each of the nodes 302A-I may be determined utilizing one or more algorithms, benchmark tests, manufacturer disclosures, etc. In another embodiment, the location of the nodes 302A-I within the DAG 300 (including which nodes point to which nodes) may be determined by analyzing properties of components in each node and comparing the overall processing speed of each of the nodes 302A-I.

Additionally, as shown, directed edges 312 point from nodes corresponding to slower unique combinations of parameter variations of the personal computer to nodes corresponding to unambiguously faster unique combinations of parameter variations of the personal computer. In this way, the bottom node 302I corresponds to the fastest unique combination of parameter variations of the personal computer, whereas the top node 302A corresponds to the slowest unique combination of parameter variations of the personal computer.

Optimizing with Segmentation

The structure of the parameter DAG 300 is determined according to increasing processing speed and/or performance of the parameter variations and the settings for each parameter variation may be determined to balance image quality and performance for each parameter variation. In the context of the present description processing and performance may refer to rendering, playback, computing, and other operations or pixel resolution. The parameter variations may be organized into groups to provide further customization of the optimal settings based on end users' expectations. An end user's expectations may vary based on a processing speed or performance level of the end user's computing system (i.e., device having a particular variation of parameters, such as CPU, GPU, and/or display resolution). For example, an end user running an application program on a computing system having lower processing speed may expect to experience a lower frame rate compared with running the same application program on a computing system having a higher processing speed. Similarly, an end user running an application program on a computing system having less processing capabilities in terms of support for characteristics influenced by the settings (e.g., image quality, sound quality, color depth, texture modes, lighting models, and the like) may expect to experience lower quality characteristics compared with running the same application program on a computing system having greater processing capabilities.

An end user may also be willing to accept varying performance in terms of frame rate depending on the genre of a gaming application program that is running on the end user's computing system. For example, an end user operating a lower-end computing system, in terms of processing speed, may be willing to accept quite low performance in terms of frame rate (e.g., 25 frames-per-second) for certain genres of gaming application programs, such as real time strategy, while demanding higher performance (e.g., 60 frames-per-second) for other genres of gaming application program, such as sports. In contrast, an end user operating a high-end computing system may have higher expectations and expect 60 frames-per-second or more across all genres of gaming application programs. Typically, an end user expects the frame rate to increase with the processing speed of the computing system. Therefore, the frame rate is expected to increase as the optimal settings increase (assuming that higher optimal settings correlate with higher quality).

The parameter DAG 300 may be segmented and different threshold targets may be set for each segment. Each threshold target may correspond to a different level of performance (e.g., frame rate) that is expected by an end user for any given computing system and a different set of target thresholds may be specified for each genre of gaming application programs. The target thresholds are used to generate optimal settings for each node within each segment. In one embodiment, each threshold target may correspond to a different power level, such as an amount of battery power remaining, a type of power supply (e.g., battery or outlet), or a level of power consumption.

Figure 3B:
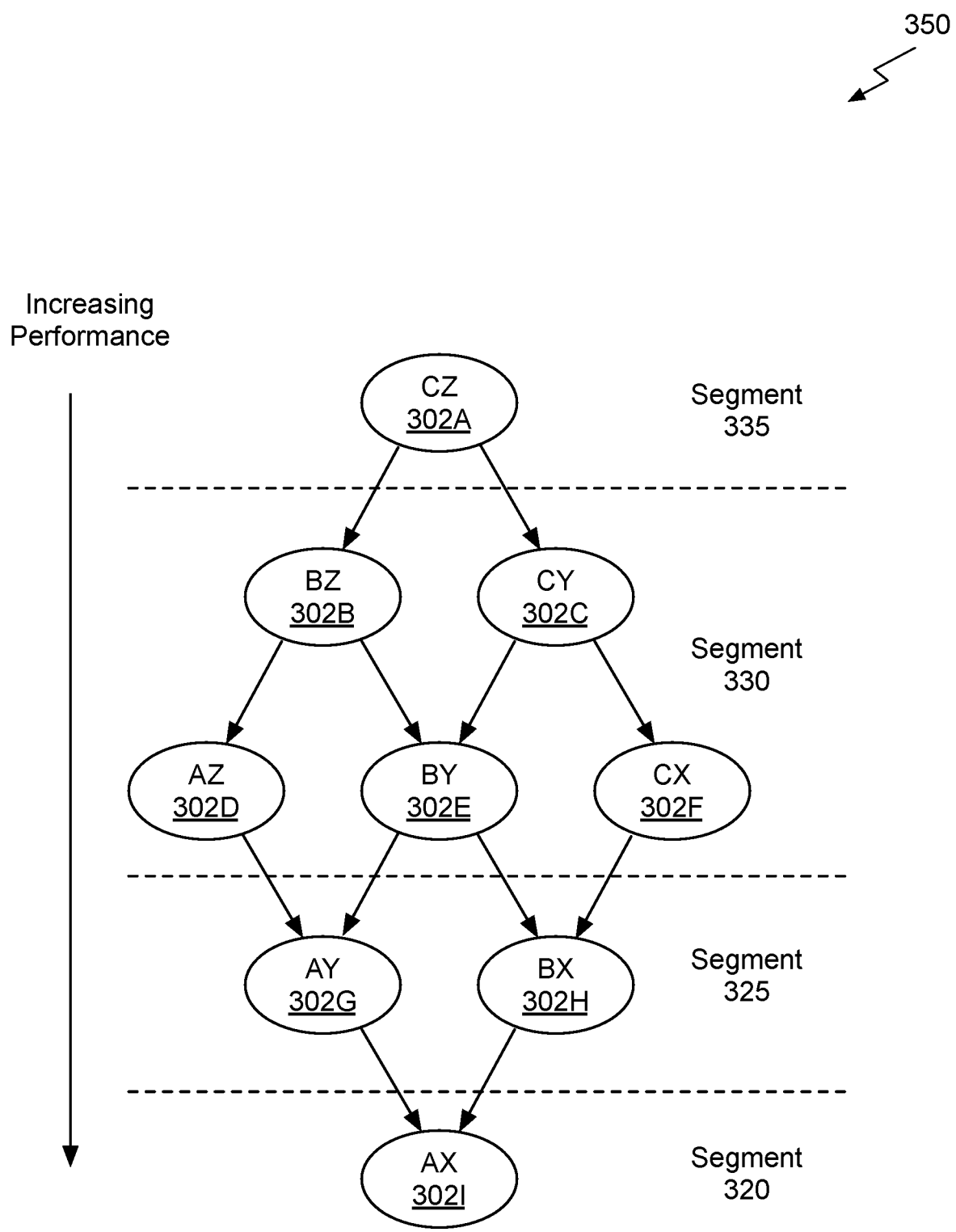
FIG. 3B shows an exemplary parameter DAG with nodes organized into segments, in accordance with another embodiment.

FIG. 3B shows the exemplary parameter DAG 300 of FIG. 3A with nodes organized into segments, in accordance with another embodiment. The segmented parameter DAG 350 may be determined by data mining, user feedback, testers' opinions, surveys, and/or developer/publisher input. As shown in FIG. 3B, the node 302I that corresponds to a parameter variation of a device having the highest-performance, in one or more respects, is included in a segment 320. The node 302I is considered to be the "fastest" node. The nodes 302G and 302H are included in a segment 325 and are "slower" than the node 302I in the segment 320. The nodes 302B, 302C, 302D, 302E, and 302F are included in a segment 330. The nodes 302G and 302H in the segment 325 are "faster" than the nodes 302B, 302C, 302D, 302E, and 302F in a segment 330. The node 302A that corresponds to a parameter variation of a device having the lowest-performance, in one or more respects, is included in a segment 335. The node 302A is the "slowest" node. For a given set of threshold target values, each segment 320, 325, 330, and 335 may be associated with a different threshold target value in the set. For example, in one embodiment, the segments 320, 325, 330, and 335 are associated with threshold target values of 60, 40, 30, and 20 frames-per-second, respectively.

In another embodiment, the segments 320, 325, 330, and 335 are associated with threshold target values of 40, 35, 30, and 25 frames-per-second, respectively. In one embodiment, the threshold targets sequentially increase with respect to increased processing speed of the plurality of parameter variations organized into the plurality of segments.

Once the threshold targets are associated with the segments, the optimal settings may be independently determined for each segment using the techniques previously described in conjunction with FIGS. 1, 2, and 3A. A consistency check is then performed to ensure that the settings monotonically increase across the different segments of the segmented parameter DAG 350 as the processing speed increases. The consistency check is needed because it is possible for a first node in a first segment that is associated with a threshold target to have a higher setting compared with a setting of a second node in a second segment that is associated with a higher threshold target. The consistency check may be performed by a consistency checker that is implemented as a software program or by circuitry in a hardware system.

For example, the optimal setting determined for the node 302E that is within the segment 330 may be higher than the optimal setting determined for the node 302G that is within the segment 325. However, based on the structure of the parameter DAG 300, the processing speed of the node 302G is higher compared with the processing speed of the node 302E. Therefore, it is counter-intuitive for the node 302G to have lower optimal settings compared with the node 302E. The optimal settings that are determined directly correlate with the quality of images produced by a computing system that uses the optimal settings for a particular application program. An end user expects that the quality of images produced by a computing system having higher processing speed to be better compared with the quality of images produced by a computing system having lower processing speed. Therefore, when the optimal settings determined for the nodes 302E and 302G fail to monotonically increase as the processing speed increases, the optimal settings are also inconsistent with the expectations of an end user.

To ensure monotonicity of the optimal settings and ensure that faster nodes do not have lower optimal settings than slower nodes, a consistency check is performed on neighboring nodes in the segmented parameter DAG 350. If an inconsistency is identified for one or more settings, the optimal settings for the slower node are lowered by a minimal amount to ensure monotonicity of the optimal settings for the two nodes. In one embodiment, the slower node inherits the lower optimal setting of the faster node. The nodes in the segmented parameter DAG 350 may be traversed starting from the fastest node to the slowest node to perform the consistency check across the segments to ensure monotonicity of the optimal settings. Ensuring consistency across the segments may provide optimal settings that meet the expectations of end users for a set of threshold targets (e.g., frame rate values) across the full spectrum of computing systems.

Figure 4A:
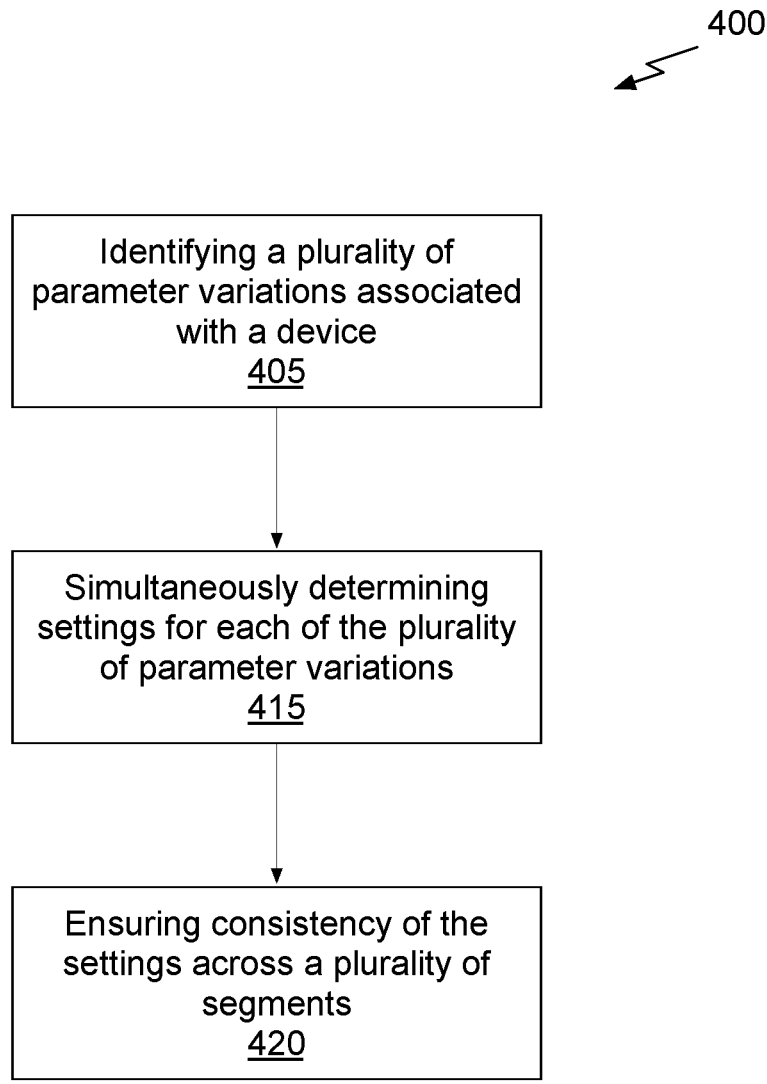
FIG. 4A shows a method for simultaneously determining a plurality of optimal settings and ensuring consistency of the settings across a plurality of segments, in accordance with another embodiment.

FIG. 4A shows a method 400 for simultaneously determining a plurality of optimal settings and ensuring consistency of the settings across a plurality of segments, in accordance with another embodiment. As shown in operation 405, a plurality of parameter variations associated with a device is identified, where the plurality of parameter variations are organized into a plurality of segments. Each segment may be associated with a different threshold target value. Additionally, as shown in operation 415, settings for each of the plurality of parameter variations are determined substantially simultaneously. As shown in operation 420, consistency of the settings across the plurality of segments is ensured. In one embodiment, the settings are adjusted to ensure the settings monotonically increase as the processing speed increases for the different parameter variations.

Figure 4B:
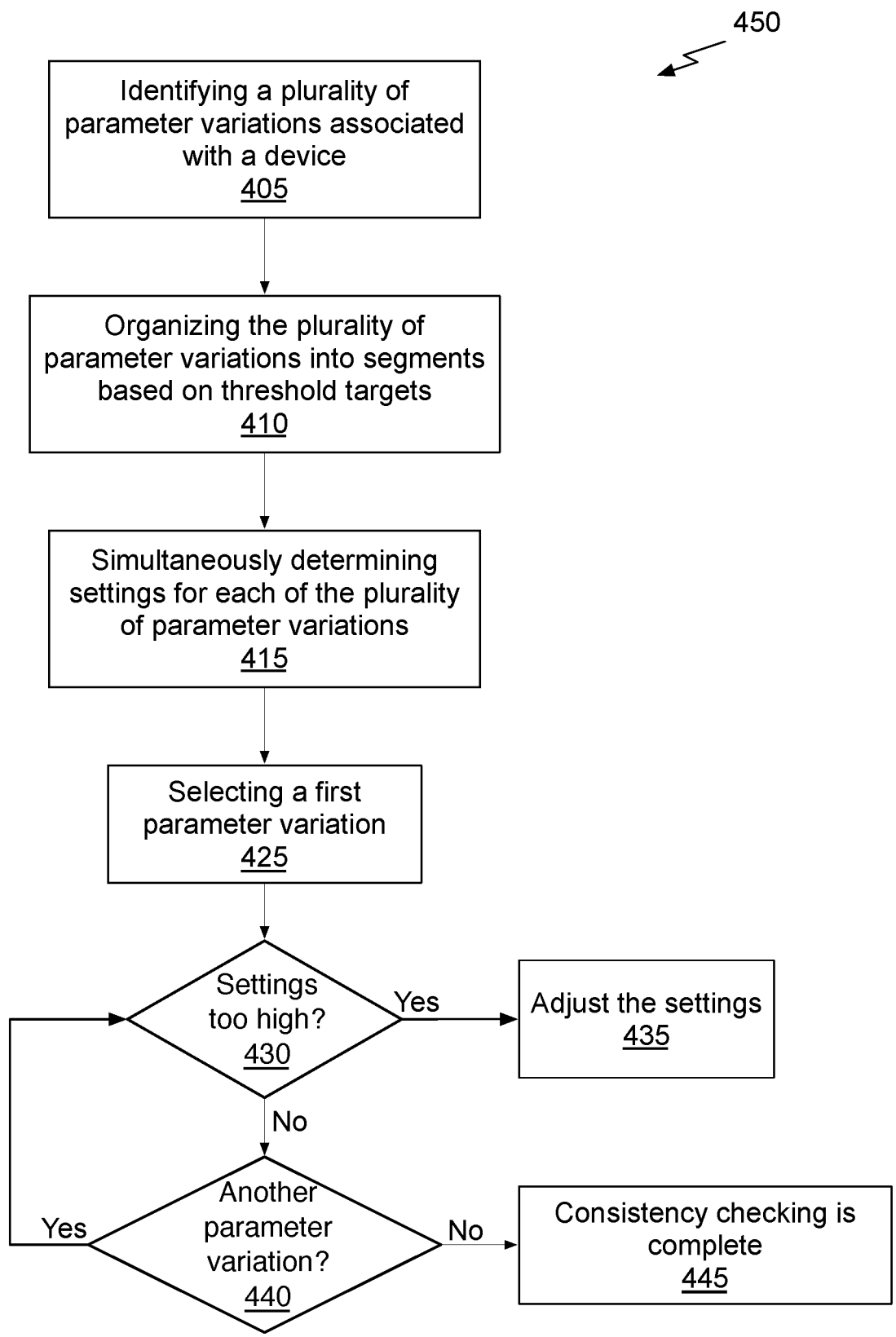
FIG. 4B shows another method for simultaneously determining a plurality of optimal settings and ensuring consistency of the settings across a plurality of segments, in accordance with another embodiment.

FIG. 4B shows another method 450 for simultaneously determining a plurality of optimal settings and ensuring consistency of the settings across a plurality of segments, in accordance with another embodiment. Operation 405 is completed as previously described. As shown in operation 410, the plurality of parameter variations are organized into a plurality of segments based on threshold targets. A set of threshold targets may be provided for each software application program or for each genre of software application program. Operation 415 is completed as previously described.

As shown in operation 425, a first parameter variation is selected by a consistency checker. The first parameter variation may correspond to a node in a parameter DAG for the device. In one embodiment, the selected node is a neighboring node of the node corresponding to the fastest node in the parameter DAG. As shown in operation 430, settings determined for the first parameter variation are examined, and, if the settings are determined to be too high, the settings for the first parameter variation are adjusted at operation 435. In the context of the present description, the settings may be too high when the settings for the first parameter correlate with a higher quality compared with the settings determined for a neighboring parameter variation that is faster than the first parameter variation. The quality may be image quality and/or sound quality. For some parameter variations, when the settings are lowered, the frame rate that is produced by the parameter variation may exceed the threshold target, so that while the image and/or sound quality decreases the frame rate increases.

If, in operation 430, a setting determined for the first parameter variation is not too high, then in operation 440, the consistency checker may identify another parameter variation having a setting that has not yet been examined. If the consistency checker identifies another parameter variation in operation 440, then the consistency checker returns to operation 430 to check the setting of the other parameter variation. Otherwise, in operation 445, the consistency checker terminates and the optimized settings for the device are ensured to be monotonically increasing as the processing speed of the different parameter variations increases.

When an end user initiates a particular application program, the end user may be presented with an interface of a software program (e.g., the consistency checker) offering to determine the optimal settings for the parameter variation corresponding to the computing system the end user is using. The software program is configured to perform the operations described in conjunction with one or more of FIGS. 1, 2, 3A, 3B, 4A, and 4B to determine optimal settings for the plurality of parameter variations. A parameter variation that most closely matches the end user's computing system is identified and the computing system may then be selectively configured to use the optimal settings that were determined for the matching parameter variation. Segmentation of the plurality of parameter variations may provide the end user with optimal settings that are consistent with his or her expectations.

Figure 5:
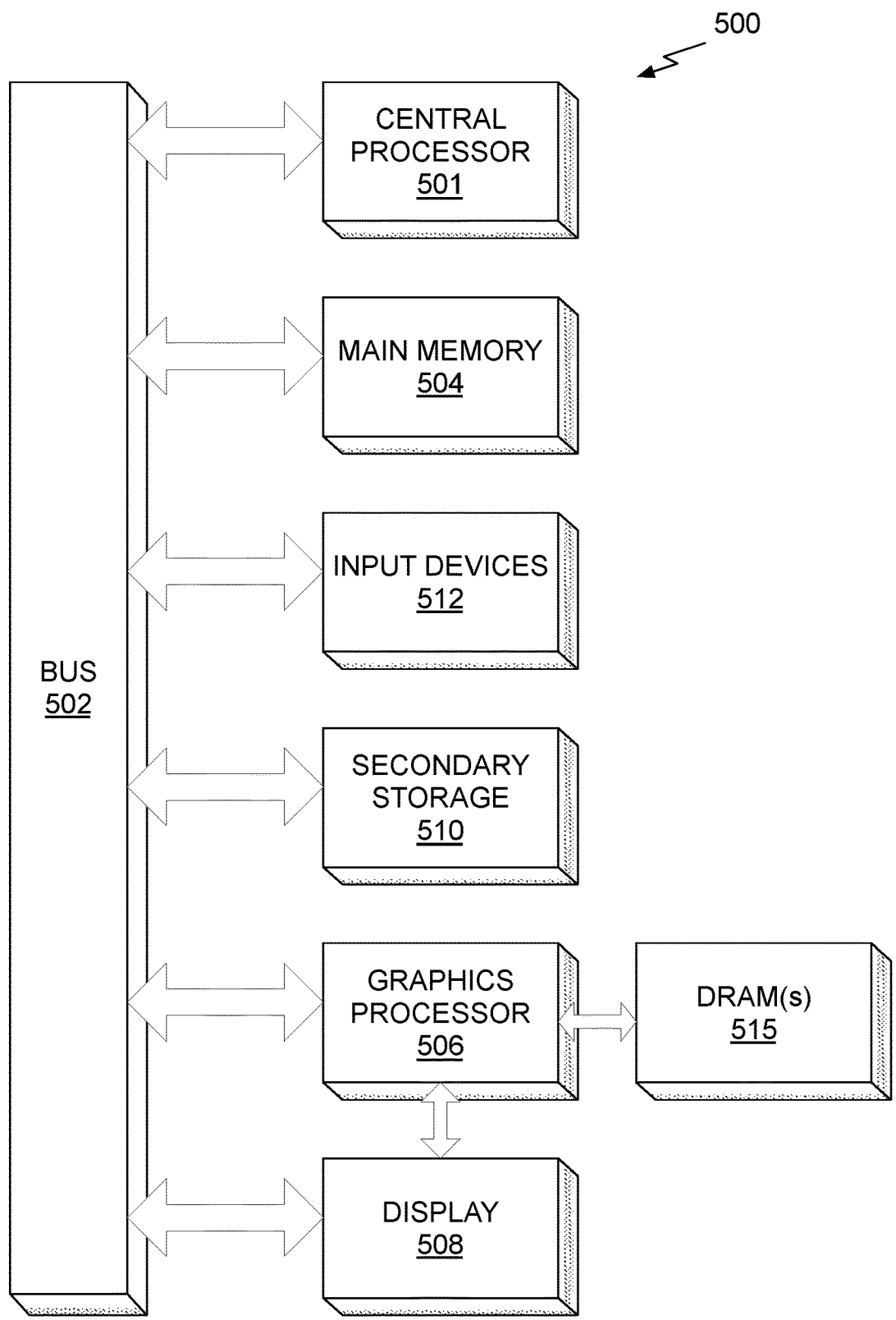
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU). The graphics processor 506 may be coupled to one or more DRAM devices 515 and may be configured to refresh different regions of the DRAM(s) at different rates based on characterization information. In one embodiment, the central processor 501 is coupled to one or more DRAM devices 515 and is configured to refresh different regions of the DRAM(s) at different rates based on characterization information. The DRAM 515 may be implemented as the DRAM 280 in FIG. 2.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the systems 500 shown in FIG. 5, may be incorporated in the system 500 to provide power to one or more of the chips.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 504 and/or the secondary storage 510. Such computer programs, when executed, enable the system 500 to perform various functions. The main memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a plurality of parameter variations for a computing device, each parameter variation in the plurality of parameter variations including a unique variation of two or more different parameters of the computing device;
   organizing the plurality of parameter variations into a plurality of segments, each segment in the plurality of segments including one or more parameter variations of the plurality of parameter variations;
   for each segment in the plurality of segments, determining optimal settings for the segment;
   performing a consistency check across the plurality of segments to ensure that the optimal settings across the plurality of segments are monotonically increasing as a processing speed increases;
   identifying an inconsistency between the optimal settings across at least two segments of the plurality of segments, the inconsistency including that the optimal settings across the at least two segments are not monotonically increasing as the processing speed increases; and
   adjusting the optimal settings for at least one node in at least one segment of the at least two segments such that the optimal settings across the at least two segments increase monotonically as the processing speed increases.

2. The method of claim 1, wherein the two or more different parameters include at least one configuration of a hardware component installed within the computing device and at least one configuration of a software component installed within the computing device.

3. The method of claim 2, wherein a parameter variation in the plurality of parameter variations for a first hardware component installed within the computing device includes at least one of a manufacturer of the first hardware component, a speed associated with the first hardware component, or a size associated with the first hardware component.

4. The method of claim 1, further comprising:
   constructing a directed acyclic graph (DAG) associated with the computing device, wherein the DAG includes a plurality of nodes directed based on one or more criteria, and wherein each node in the plurality of nodes corresponds to one parameter variation in the plurality of parameter variations.

5. The method of claim 4, further comprising:
   organizing the plurality of nodes included in the DAG into the plurality of segments.

6. The method of claim 5, wherein each segment in the plurality of segments includes one or more nodes in the plurality of nodes included in the DAG.

7. The method of claim 6, where different threshold targets are set for each segment in the plurality of segments.

8. The method of claim 1, wherein the consistency check is performed by a software program.

9. The method of claim 1, wherein the consistency check is performed by circuitry in a hardware system.

10. The method of claim 1, wherein the optimal settings are determined based on a threshold target set for the segment.

11. The method of claim 10, wherein the threshold target includes a frame rate value.

12. A non-transitory computer readable medium encoded with a computer program product, comprising:
    code for identifying a plurality of parameter variations for a computing device, each parameter variation in the plurality of parameter variations including a unique variation of two or more different parameters of the computing device;
    code for organizing the plurality of parameter variations into a plurality of segments, each segment in the plurality of segments including one or more parameter variations of the plurality of parameter variations;
    for each segment in the plurality of segments, code for determining optimal settings for the segment;
    code for performing a consistency check across the plurality of segments to ensure that the optimal settings across the plurality of segments are monotonically increasing as a processing speed increases;
    code for identifying an inconsistency between the optimal settings across at least two segments of the plurality of segments, the inconsistency including that the optimal settings across the at least two segments are not monotonically increasing as the processing speed increases; and
    code for adjusting the optimal settings for at least one node in at least one segment of the at least two segments such that the optimal settings across the at least two segments increase monotonically as the processing speed increases.

13. The non-transitory computer readable medium of claim 12, wherein the two or more different parameters include at least one configuration of a hardware component installed within the computing device and at least one configuration of a software component installed within the computing device.

14. The non-transitory computer readable medium of claim 13, wherein a parameter variation in the plurality of parameter variations for a first hardware component installed within the computing device includes at least one of a manufacturer of the first hardware component, a speed associated with the first hardware component, or a size associated with the first hardware component.

15. A system, comprising:
    a memory storing computer instructions; and
    a processor coupled to the memory and configured to execute the computer instructions to:
    identify a plurality of parameter variations for a computing device, each parameter variation in the plurality of parameter variations including a unique variation of two or more different parameters of the computing device;

organize the plurality of parameter variations into a plurality of segments, each segment in the plurality of segments including one or more parameter variations of the plurality of parameter variations;

for each segment in the plurality of segments, determine optimal settings for the segment;

perform a consistency check across the plurality of segments to ensure that the optimal settings across the plurality of segments are monotonically increasing as a processing speed increases;

identify an inconsistency between the optimal settings across at least two segments of the plurality of segments, the inconsistency including that the optimal settings across the at least two segments are not monotonically increasing as the processing speed increases; and adjust the optimal settings for at least one node in at least one segment of the at least two segments such that the optimal settings across the at least two segments increase monotonically as the processing speed increases.

16. The system of claim 15, wherein the two or more different parameters include at least one configuration of a hardware component installed within the computing device and at least one configuration of a software component installed within the computing device.

17. The system of claim 16, wherein a parameter variation in the plurality of parameter variations for a first hardware component installed within the computing device includes at least one of a manufacturer of the first hardware component, a speed associated with the first hardware component, or a size associated with the first hardware component.

* * * * *